United States Patent [19]

Inagami et al.

[11] Patent Number: 4,760,545
[45] Date of Patent: Jul. 26, 1988

[54] VECTOR PROCESSING APPARATUS INCLUDING VECTOR REGISTERS HAVING SELECTIVELY ACCESSIBLE STORAGE LOCATIONS

[75] Inventors: Yasuhiro Inagami, Kokubunji; Shigeo Nagashima, Hachiouji, both of Japan

[73] Assignee: Hitachi, Ltd., Tokyo, Japan

[21] Appl. No.: 684,786

[22] Filed: Dec. 21, 1984

[30] Foreign Application Priority Data

Dec. 23, 1983 [JP] Japan ................................ 58-242034

[51] Int. Cl.$^4$ .......................................... G06F 15/347
[52] U.S. Cl. ...................................... 364/200; 364/736
[58] Field of Search ... 364/200 MS File, 900 MS File, 364/736

[56] References Cited

U.S. PATENT DOCUMENTS

| | | | |
|---|---|---|---|
| 4,270,181 | 5/1981 | Tanakura et al. | 364/736 |
| 4,293,941 | 10/1981 | Muraoka et al. | 364/200 |
| 4,302,818 | 11/1981 | Niemann | 364/736 |
| 4,435,765 | 3/1984 | Uchida et al. | 364/200 |
| 4,507,728 | 3/1985 | Sakamoto et al. | 364/200 |
| 4,541,046 | 9/1985 | Nagashima et al. | 364/200 |
| 4,594,682 | 6/1986 | Drimak | 364/900 |

*Primary Examiner*—Thomas M. Heckler
*Assistant Examiner*—Christina Eakman
*Attorney, Agent, or Firm*—Antonelli, Terry & Wands

[57] ABSTRACT

A vector instruction which designates calculation of vector data or vector data transfer between vector registers and the main memory, is arranged in such a way as to specify an element in the vector register from which the read/write operation is to be commenced, in order to make it possible to start the reading or writing of the vector data stored in the vector register from any desired element, thereby allowing a partial reference to the array data to be made on the vector register. Further, a vector instruction, which designates the vector data transfer between each vector register and the main memory, is arranged in such a way as to be able to specify the number of vector data elements to be transferred, thereby allowing transfer of elements requisite and adequate for a plurality of partial references on the vector register.

64 Claims, 9 Drawing Sheets

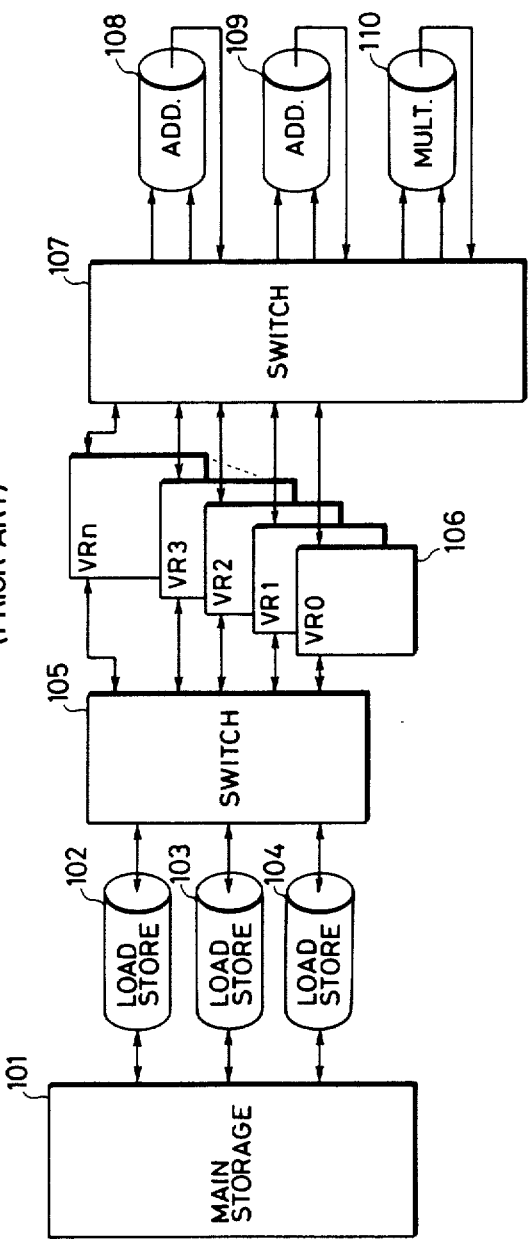

FIG. 4a

| 0 | 15 16 | 23 24 | 31 32 | 39 40 | 47 48 | 53 54 | 63 |
|---|---|---|---|---|---|---|---|
| OP | R1 | D1 | R2 | D2 | R3 | D3 | |

| | |
|---|---|
| OP | OPERATION CODE |
| R1 | VECTOR REGISTER NUMBER OF THE FIRST OPERAND |
| R2 | VECTOR REGISTER NUMBER OF THE SECOND OPERAND |
| R3 | VECTOR REGISTER NUMBER OF THE THIRD OPERAND |
| D1 | WRITE START ELEMENT NUMBER FOR A VECTOR REGISTER R1 |
| D2 | READ START ELEMENT NUMBER FOR A VECTOR REGISTER R2 |
| D3 | READ START ELEMENT NUMBER FOR A VECTOR REGISTER R3 |

FIG. 4b

| 0 | 15 16 | 23 24 | 31 32 | 39 40 | 47 48 | 63 |
|---|---|---|---|---|---|---|
| OP | R1 | D1 | VAR | VIR | L | |

| | |
|---|---|
| OP | OPERATION CODE |
| R1 | VECTOR REGISTER NUMBER OF THE FIRST OPERAND |
| D1 | READ/WRITE START ELEMENT NUMBER FOR A VECTOR REGISTER R1 |
| VAR | VECTOR ADDRESS REGISTER NUMBER |
| VIR | VECTOR INCREMENT REGISTER NUMBER |
| L | TRANSFERRED VECTOR ELEMENT NUMBER |

FIG. 8

| INSTRUCTION ① | LOAD | VR0 | 0 | VAR0 | VIR0 | 102 |
|---|---|---|---|---|---|---|
| INSTRUCTION ② | ADD | VR1 | 0 | VR0 | 0 | VR0 | 1 |
| INSTRUCTION ③ | ADD | VR2 | 0 | VR1 | 0 | VR0 | 2 |

VECTOR PROCESSING APPARATUS INCLUDING VECTOR REGISTERS HAVING SELECTIVELY ACCESSIBLE STORAGE LOCATIONS

CROSS-REFERENCE TO RELATED APPLICATIONS AND PATENTS

1. U.S. application Ser. No. 594,301, now U.S. Pat. No. 4,651,274, by Omoda et al, "Vector Data Processor".
2. U.S. application Ser. No. 453,094 now U.S. Pat. No. 4,617,625, by Nagashima et al, "Vector Processor".
3. U.S. Pat. No. 4,443,394 to Torii et al, "First-In, First-Out Storage and Processing Unit".

BACKGROUND OF THE INVENTION

The present invention relates to a digital type electronic computer of the type which is suitable for vector processing and which can execute vector calculation at high speed. This type of computer will be referred to as a "vector processing apparatus" hereinafter.

FIG. 1 shows one example of the FORTRAN program which often is used for scientific and technical calculation. According to the program shown in FIG. 1, the storing operation in relation to array data A, B is effected as follows (A(0)+A(1)+A(2)) * 0.33 is stored in B(1) (A(1)+A(2)+A(3)) * 0.33 is stored in B(2) (A(2)+A(3)+A(4)) * 0.33 is stored in B(3) . . . (A(98)+A(99)+A(100)) * 0.33 is stored in B(99) (A(99)+A(100)+A(101)) * 0.33 is stored in B(100).

More specifically, processing is carried out in regard to the first element in the array A in such a manner that the element A(I), the element A(I−1) which immediately precedes the element A(I) and the element A(I+1) which immediately follows the element A(I) are added together and are multiplied by 0.33 (divided by 3). This type of calculation is used in the type of processing where, for example, in a particle simulation, particles are made to correspond to respective elements in the array A, and the state of a particular particle A(I) after a predetermined time has passed is calculated from the present state of a particle A(I−1) and a particle A(I+1) which are respectively immediately in front of and behind the particle A(I). This type of calculation frequently is used in scientific and technical applications. Although the array may be two-dimensional or three-dimensional according to problems to be solved by scientific and techincal calculation, consideration will be herein given to a one-dimensional array such as that shown in FIG. 1 in order to facilitate explanation.

A typical conventional vector processing apapratus has vector registers which temporarily hold vector data and is arranged such that the vector data in a main memory is read out therefrom at high speed, is first stored in the vector registers, is then read out from the vector registers at high speed and is delivered to pipeline calculators, thereby allowing the vector data calculation to be processed at high speed.

FIG. 2 is an illustration schematically showing the arrangement of a vector processing apparatus employed for the program shown in FIG. 1. In FIG. 2, the reference numeral 101 denotes a main memory, while the reference numerals 102 to 104 represent load and store circuits which control the data transfer between the main memory and a plurality of vector registers forming a vector register group, which is constituted by a total of (N+1) vector registers numbered from 0 to N in the example shown in FIG. 2. Each vector register has the function to hold as a block a plurality of elements of vector data, for example, 256 elements of data. The reference numerals 108, 109 represent adders of a pipeline structure which add the data read out from vector registers by means of pipelining and write the results of addition into a selected vector register. The reference numeral 110 denotes a multiplier having a pipeline structure which is similar to the pipelining structure of adders 108, 109 except that the multiplier and the adders differ from each other in the type of calculation performed. The reference numeral 105 denotes a switching circuit which controls the connecting relationship between the (N+1) vector registers and the calculators 108 to 109. It is to be noted that the respective numbers of the load and store circuits, the vector registers, the adders and the multiplier provided in the vector processing apparatus shown in FIG. 2 are not critical.

The FORTRAN program shown in FIG. 1 may be processed in the vector processing apparatus shown in FIG. 2, for example, as follows:

1. The switching circuit 105 is controlled such that the load and store circuits 102, 103 and 104 are respectively connected to the vector register No. 0 (VR0), No. 1 (VR1) and No. 2 (VR2).

2. The load and store circuit 102 is employed to load the vector data A(I−1) into the vector registers VR0 in the order, A(0), A(1), . . . , A(99). Similarly, the load and store circuit 103 is employed to load the vector data A(I) into the vector register VR1 in the order, A(1), A(2), A(3), . . . , A(100), and the load and store circuit 104 is employed to load the vector data A(I+1) into the vector register in the order, A(2), A(3), . . . , A(101).

3. The switching circuit 107 is controlled such that the vector registers VR0, VR1, VR3 are connected to the pipeline adder 108, while the vector registers VR2, VR3, VR4 are connected to the pipeline adder 109.

4. The vector data A(I−1) is successively read out from the vector register VR0, while the vector data A(I) is successively read out from the vector register VR1, and the read out data is supplied to the pipeline adder 108 in which A(I−1)+A(I) is calculated, and the result of the calculation is written into the vector register VR3.

5. The vector data A(I+1) is successively read out from the vector register VR2, while the result of the calculation of A(I−1)+A(I) is successively read out from the vector register VR3, and the read-out data is supplied to the pipeline adder 109 where A(I−1)+A(I)+A(I+1) is calculated, and the result of the calculation is written into the vector register VR4.

6. Then, the result of the calculation of A(I−1)+A(I)+A(I+1) is read out from the vector register VR4 and is supplied to the pipeline multiplier 110 where the read-out value is multiplied by the value 0.33, and the result of the multiplication is stored in the main memory. This procesing step (6) is, however, not directly related to the present invention; therefore, a more detailed description thereof is omitted.

In the case of processing the FORTRAN program shown in FIG. 1 in the conventional vector processing apparatus shown in FIG. 2, almost all of the vector element data of the three vectors, that is, the vector A(I−1) loaded into the corresponding vector register in the order, A(0), A(1), . . . , A(99), the vector A(I) loaded into the corresponding vector register in the order, A(1), A(2), . . . , A(100), and the vector A(I+1) loaded into the corresponding vector register in the order, A(2), A(3), ..., A(101) overlap one another with only the top vector elements thereof being different from each other. FIG. 3 shows how the respective vectors overlap one another. Thus, the conventional vector processing apparatus has the following problems.

When the three vectors A(I−1), A(I), A(I+1) are to be loaded, three load and store circuits 102 to 104 shown in FIG. 2 are required to load the 98 vector data elements A(2) to A(99), and therefore, contention may arise when these elments are read out from the main memory, resulting in a reduction in the reading rate. The utilization ratio of the load and store circuits is unfavorably low, since three loading and storing circuits are employed to load the three vectors in which almost all the data elements overlap one another.

SUMMARY OF THE INVENTION

A primary object of the present invention is to provide a vector processng apparatus having means by which when array data is partially referred to by different elements at a certain number of positions in the array data, the partial reference to the array data is efficiently processed by avoiding the above-described conventional operation wherein some vector data having element data overlapping one another are individually loaded in the respective vector registers.

According to the invention, a vector instruction which designates calculation of vector data or vector data transfer between vector registers and the main memory, is arranged in such a way as to specify an element in the vector register from which the read/write operation is to be commenced, in order to make it possible to start the reading or writing of the vector data stored in the vector register from any desired element, thereby allowing a partial reference to the array data to be made on the vector register. Further, a vector instruction which designates the vector data transfer between each vector register and the main memory, is arranged in such a way as to be able to specify the number of vector data elements to be transferred, thereby allowing transfer of elements requisite and adequate for a plurality of partial references on the vector register.

BRIEF DESCRIPTION OF THE DRAWINGS

FIG. 1 is in a diagram showing one example of the FORTRAN program which is employed in an embodiment of the present invention;

FIG. 2 is a schematic diagram showing one example of the arrangement of a conventional vector processing apparatus;

FIGS. 4a and 4b are respectively a diagram showing vector instruction formats in accordance with an embodiment of the present invention;

FIG. 8 is a diagram of vector instruction series which are employed to process the FORTRAN program shown in FIG. 1 in one embodiment of the invention;

DETAILED DESCRIPTION OF THE PREFERRED EMBODIMENT

Figure 3:
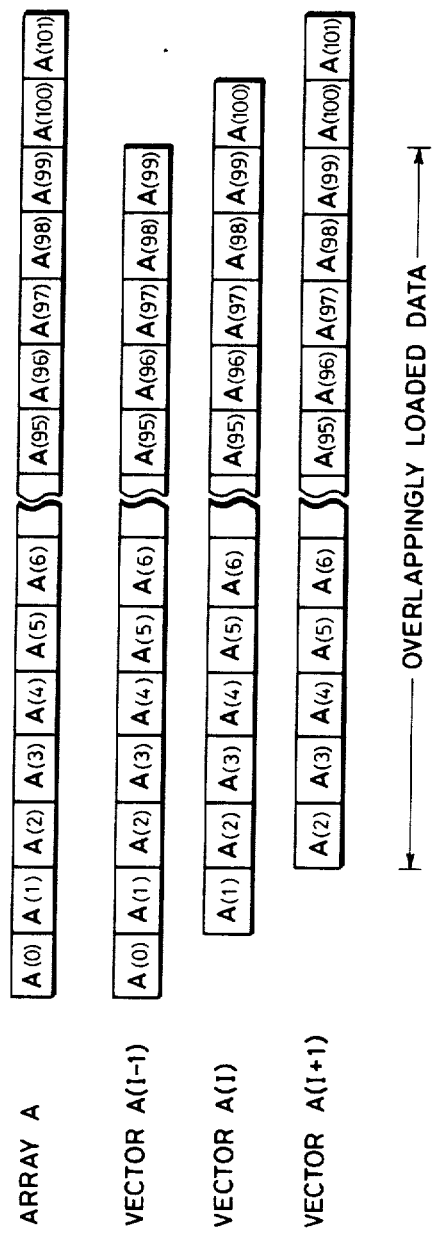
FIG. 3 is a diagram showing how partial references are made to array data in accordance with the FORTRAN program shown in FIG. 1.

FIGS. 4a and 4b respectively show an example of the vector instruction formats in a vector processing apparatus in accordance with an embodiment of the invention. In FIGS. 4a or 4b, numerals shown in instruction formats 1, 2 are numerical values representing the instruction bit positions. The vector instruction in accordance with this embodiment has a length of 64 bits. The vector instruction format differs between a calculation vector instruction 1 which, for example, designates addition or multiplication and a load or store vector instruction 2 which designates vector data transfer between the vector registers and the main memory.

In the calculation vector instruction 1, the first 16-bit portion thereof is employed to specify the type of calculation, and the following 16-bit portions are respectively employed to specify a first operand, a second operand and a third operand. The contents specified by each operand includes two items, that is, the number of a vector register to store vector data and the starting element number which designates an element in the vector register from which a read or write operation is to be commenced. In the calculation vector instruction, the first operand represents both the number of a vector register into which the result of calculation is to be written and the write starting element number, while each of the second and third operands represents the number of a vector register from which vector data to be calculated is to be read out and the read starting element number. For example, with respect to the vector addition command, the contents of the vector register specified by the second operand and the contents of the vector register specified by the third operand are added together, and the result of addition is written into the vector register specified by the first operand.

With respect to the load or store vector instruction, bits 0 to 15 are employed to specify the operation contents, i.e., load or store. Further, the portion of the command represented by the bits 16 to 31 is employed to specify a first operand, the portion represented by the bits 32 to 39 is employed to specify the number of a vector address register (VAR); the portion represented by the bits 40 to 47 is employed to specify the number of a vector increment register (VIR); and the portion represented by the bits 48 to 63 is employed to specify the number of vector data elements to be transferred between the main memory and a vector register. The bits 16 to 23 of the first operand specifies the number of a vector register to be used to transfer data to the main memory, and the bits 24 to 31 of the first operand specifies the read/write starting element number of the transfer. The VAR is a register which holds the top address of the vector data on the main memory. The vector increment register which holds the distance or displacement between the elements of the vector data on the main memory. From the values of the VAR and the VIR is calculated the address of the vector data elements which are on the main memory and are to be subsequently subjected to a read or write operation. It is to be noted that the length of each instruction and the number of bits employed to specify each operand which are mentioned in the example shown in FIGS. 4a or 4b are not essential to the present invention.

Figure 5:
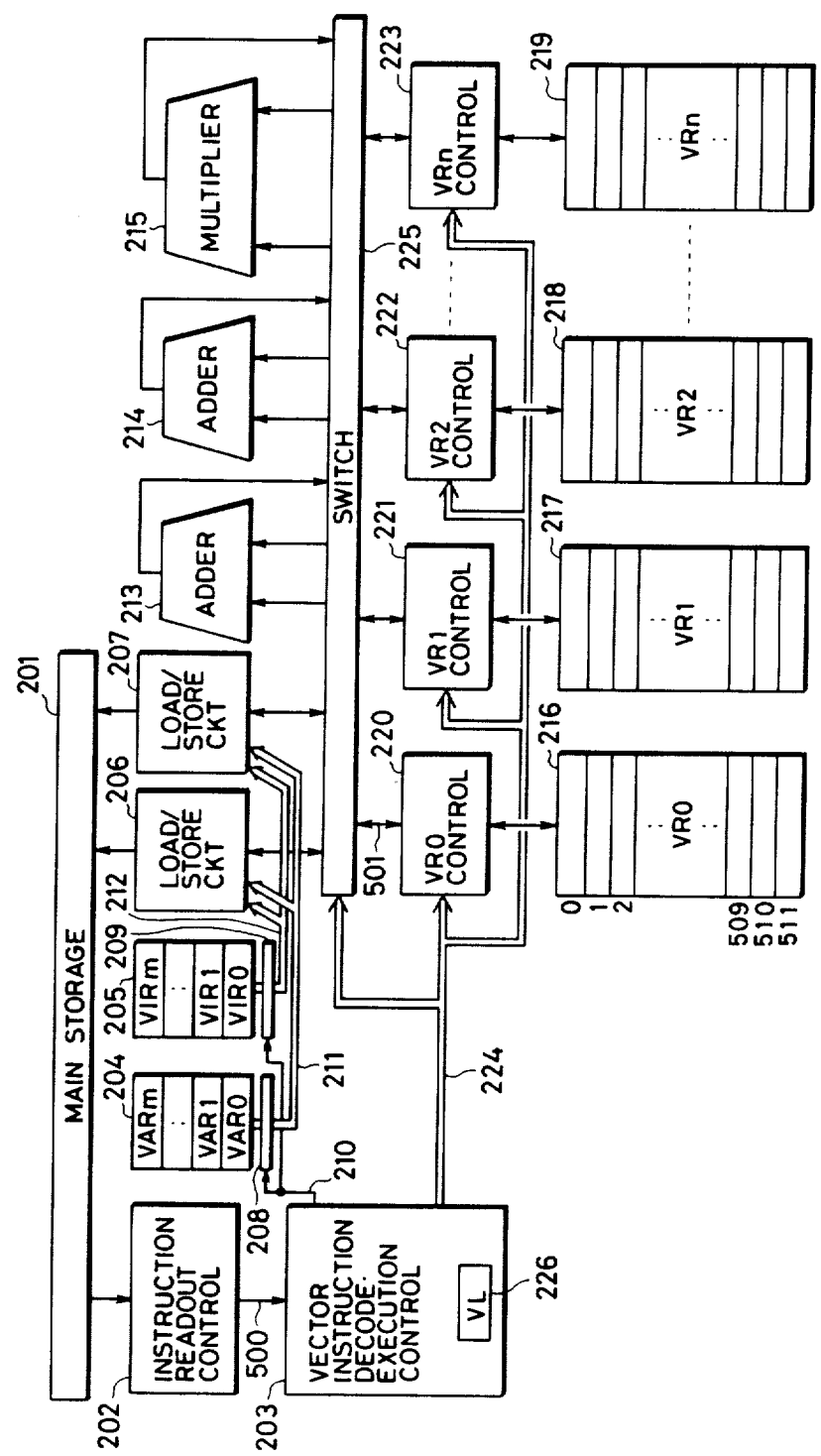
FIG. 5 is a schematic diagram of a vector processing apparatus in accordance with one embodiment of the present invention.

FIG. 5 shows the arrangement of the vector processing apparatus in accordance with the embodiment of the invention. In FIG. 5, the reference numeral 201 denotes a main memory, while the reference numeral 202 represents an instruction read control circuit which reads out a vector instruction from the main memory and delivers the read-out instruction to an instruction decoding and execution control circuit 203 through a signal line 500. The vector instruction decoding and execution control circuit 203 decodes the vector instruction read out from the main memory and delivers into the vector processing apparatus control data required for execution of the vector instruction. The reference numeral 204 denotes a vector address register group which is constituted, in accordance with this embodiment, by (m+1) vector address registers numbered from 0 to m. The reference numeral 205 represents a vector increment register group which is constituted by (m+1) vector increment registers numbered from 0 to m. The reference numerals 206, 207 denote load and store circuits which process the vector data transfer between the main memory and the vector registers. An example of such a circuit is disclosed in a copending U.S. patent application Ser. No. 453,094, now U.S. Pat. No. 4,617,625, which is incorporated herein by reference. The reference numerals 208, 209 denote selector circuits which respectively select the values of the VAR and the VIR in accordance with the VAR number and the VIR number specified by the instruction decoding and execution control circuit 203 through a control line 210 and place the selected values onto address lines 211, 212. The respective values of the VAR and the VIR are delivered to the load and store circuits 206, 207 through the address lines 211, 212. The reference numerals 213 to 214 denote pipleine adders each of which adds the vector data read out from vector registers by means of a pipelining method and writes the result of addition into a vector register. The reference numeral 215 represents a pipeline multiplier which multipies the vector data read out from vector registers and writes the result of multiplication into a vector register. The reference numerals 216 to 219 denote vector registers (VR). In this embodiment, there are (n+1) vector registers which are numbered from 0 to n. In addition, one vector register holds 512 vector elements at maximum. The reference numerals 220 to 223 represent vector register control circuits which control reading out of vector data from the vector registers or writing of the former into the latter. One of the vector register control circuits is provided for each vector register and is adapted to commence an operation in response to a control signal from the vector instruction decoding and execution control circuit 203. The reference numeral 501 denotes a data bus between each vector register control circuit and a switch 225. The reference numeral 224 represents a control signal line group for delivering control signals from the vector instruction decoding and execution control circuit 203 to the vector register control circuits 220 to 223. The control signals include (1) a vector register number signal, (2) a read designating signal, (3) a write designating signal, (4) a read/write starting element number signal, (5) a read pointer number signal, and (6) a processed vector element number signal. The vector register control circuits 220 to 223 receive the above-described six kinds of control signal from the instruction decoding and execution control circuit 203 through the control signal line group 224 and decodes the vector register numbers to make judgement as to whether or not the vector register control circuits respectively are to commence operation. The vector register control circuit judged to be starting an operation checks the read designating signal, the write designating signal and the read/write starting element number signal and commences reading or writing elements successively from the element having the specified number. The processing of the read pointer number signal will be described later. The reference numeral 225 denotes a switching circuit which responds to program instructions and controls the connecting relationship between the vector registers on the one hand and the load and store circuits, the adders and the multiplier on the other so that vector elements are transferred between the former and the latter. An example of such a switch is disclosed in a copending U.S. patent application Ser. No. 453,094, now U.S. Pat. No. 4,617,625, which is incorporated herein by reference. The reference numeral 226 represents a register which is within the vector instruction decoding and execution control circuit and is adapted to hold the number of vector elements to be processed when a calculation instruction is executed.

It is to be noted that the respective numbers of the VARs, the VIR, the load and store circuits, the adders, the multiplier and the vector registers which are mentioned in the embodiment shown in FIG. 5 are not essential to the present invention.

The following is a description of outlines of the operation of the whole of the vector processing apparatus shown in FIG. 5. The vector instructions stored in the main memory 201 are successively read out by the instruction read control circuit 202 and are delivered to the vector instruction decoding and execution control circuit 203. The vector instruction decoding and execution control circuit 203 decodes each vector instruction read out, which is then subjected to processing required for execution of the instruction. In the case where the decoded vector instruction is a load or store instruction, the following signals are delivered to the vector register control circuits 220 to 223 through the control signal line group 224: (1) both a vector register number signal and a signal representing the read/write starting element number specified by the first operand; (2) a signal representing the number of vector data elements to be transferred which is specified by the L field in FIG. 4b; and (3) a write designating signal in the case of a load instruction while a read designating signal is provided in the case of a store instruction. The vector register number signal is also transferred to the switch circuit 225, to control it, based upon the decoded instruction, in such a manner that an output of a specified vector register is connected to a store output of a load or store circuit 206 or 207 in case of a store instruction, and that on input of the specified vector register is connected to a load output of the load or store circuit, in case of a load instruction. Thus, a read or write operation in relation to the specified vector register is commenced. Further, the VAR number and the VIR number which are specified by the instruction are delivered from the vector instruction decoding and execution control circuit 203 through the control line 210 in order to control the respective selector circuits 208, 209, thereby to read out the values of the specified VAR and VIR, which are respectively delivered to the load and store circuits 206, 207 through the address lines 211, 212. The load and store circuits then respectively calculate the addresses of the vector data on the main memory in accordance with the values of the VAR and the VIR, so that reading or writing of the vector data on the main memory is commenced. In the above-described manner, the transfer of vector data is started between the main memory and the vector registers, and the processing of the load or store vector instruction is carried out.

When the decoded vector instruction is a calculation instruction, the following signals are delivered to the vector register control circuits 220 to 223 through the control signal line group 224: (1) both a signal representing the vector register numbers and a signal representing the read/write starting element numbers which are specified by the first, second and third operands of the instruction; (2) a signal representing the number of vector elements to be processed which is shown by the processed vector element number holding register 226; (3) a write designating signal in relation to the vector register corresponding to the first operand, and read designating signals and the like in relation to the vector registers corresponding to the second and third operands. The vector register number signals is also transferred to the switch circuit 225 to control it based upon the decoded instruction in such a manner that an output of a specified vector register is connected to an input of a specified operation circuit such as an adder 213, 214 or a multiplier 215, and an output of the operation circuit is connected to an input of another specified vector register. Thus, a read or write operation in relation to the vector registers is commenced. Moreover, the adders or multiplier start an operation in accordance with the type of calculation specified by the instruction. In consequence, the vector data which is read out from the vector registers respectively specified by the second and third operands is delivered to the adders or the multiplier so as to be calculated, and the result of calculation is written into the vector register specified by the first operand.

Figure 6:
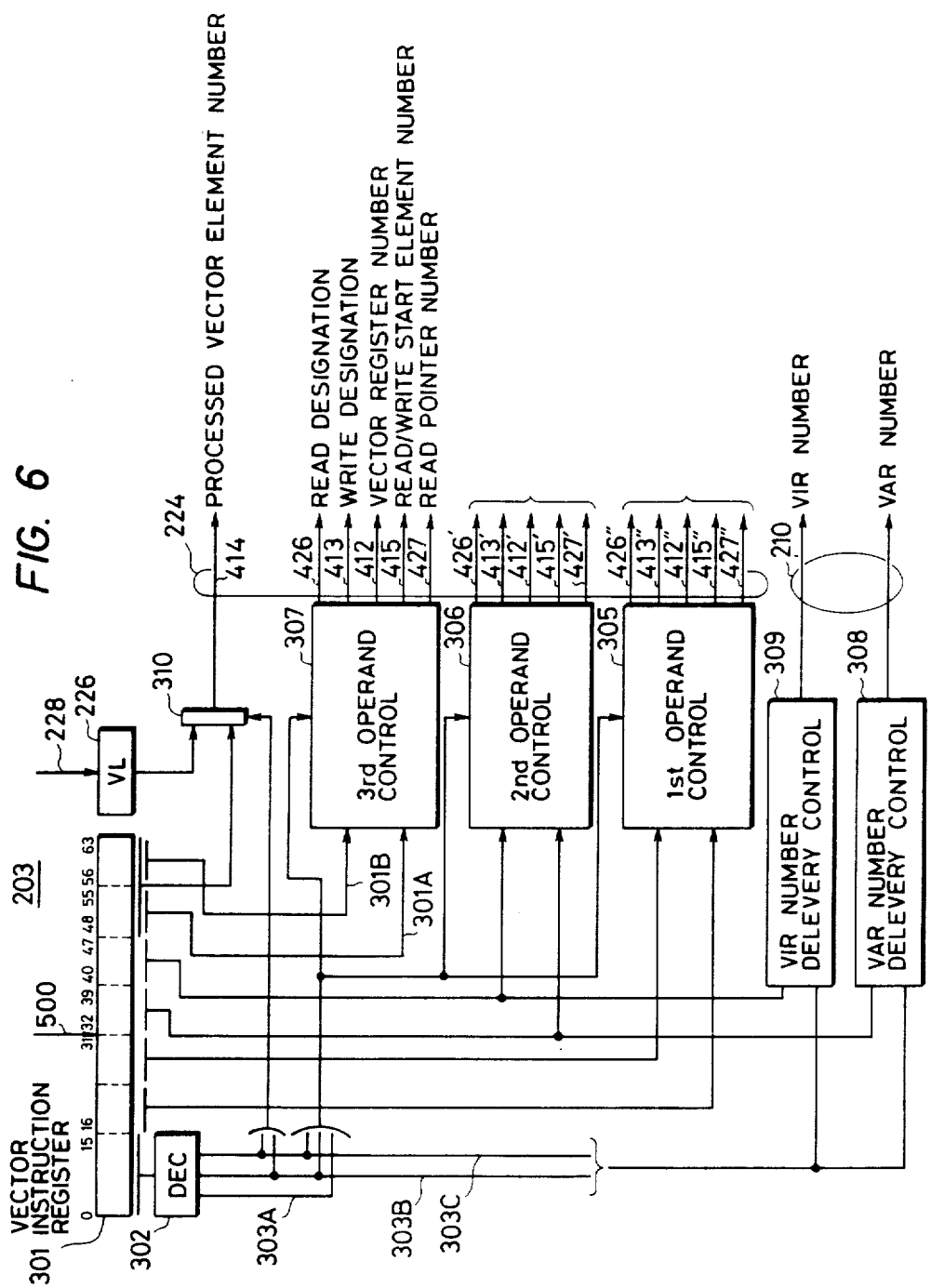
FIG. 6 is a schematic diagram of the vector instruction decoding and execution control circuit in one embodiment of the invention shown in FIG. 5.
Figure 7:
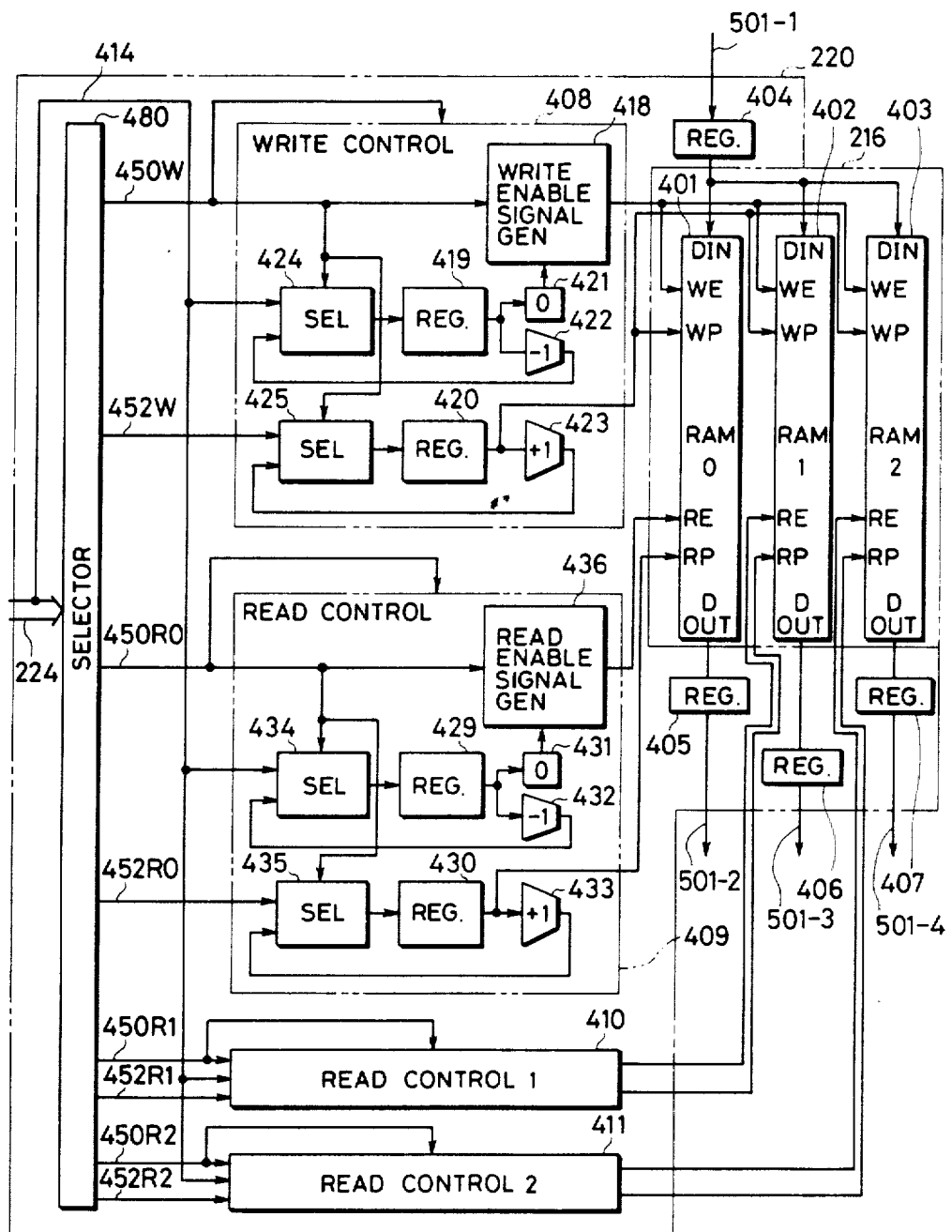
FIG. 7 is a schematic diagram of a vector register and a vector register control in accordance with one embodiment of the invention.

The vector instruction decoding and execution control circuit 203 shown in FIG. 5 will be described hereinunder in detail with reference to FIG. 6. In FIG. 6, the reference numeral 301 decodes a vector instruction register which is constituted by 64 bits in order to hold one vector instruction as shown in FIGS. 4a or 4b and is adapted to store a vector instruction read out by the instruction read control circuit 202 in FIG. 5. The reference numeral 302 in FIG. 6 represents a decoder circuit which decodes the vector instruction operation code in the portion of the vector instruction register 301 represented by the bits 0 to 15 to check the contents of processing specified by the vector instruction. The reference numerals 303A to 303C denote control signal lines which deliver the outputs of the decoder circuit 302. The control signal line 303A turns ON when the instruction in the vector instruction register 301 is a calculation instruction, while the control signal lines 303B and 303C turn ON when the instruction is a load instruction and a store instruction, respectively. The control signal lines 303A to 303C never simultaneously turn ON. The reference numerals 305, 306 and 307, respectively, denote a first operand control circuit, a second operand control circuit and a third operand control circuit, which respectively generate control signals to be delivered to the vector register control circuits 220 to 223 shown in FIG. 5 in accordance with the vector register numbers and the read/write starting element number specified by the fields of the vector instruction register 301 which respectively designate the first, second and third operands. In this case, the second and third operand control circuits 306, 307 operate only in the case of processing which is effected by a calculation instruction in which the control signal line 303A is ON, but do not operate in the case of a load or store instruction. The control data delivered from the first, second and third operand control circuits 305, 306 and 307 include: (1) a read designation signal applied through a signal line 426; (2) a write designating signal applied through a signal line 413; (3) a vector register number signal applied through a signal line 412; (4) a read/write starting element number signal applied through a signal line 415; and (5) a read pointer number signal applied through a signal line 427. In this case, each vector register in accordance with the embodiment of the invention, as described later with reference to FIG. 7, is arranged so as to be read simultaneously and independently of each other so that a multiplicity of 3 vector registers may be read at the same time and therefore, three read control circuits (FIG. 7, 409 to 411) are provided for each vector register so as to be equal in number to the multiplicity. The read pointer number, accordingly, specifies which one of the three read control circuits is to be used.

Details of the first to third operand controls 305 to 307 will be explained with reference to FIG. 9, which is a schematic block diagram of the operand control 307 and which is designed so that the same circuit can be used as any one of the first to third operand controls 305 to 307, as will be clear from the following explantion. The lines 303A, 303B and 303C become on, respectively, when a calculation instruction, a load instruction or a store instruction is decoded by the decoder 302. The line 301A receives a vector register number for the third operand from the bits 48 to 55 of the instruction register 301. The line 301B receives a read/write start element number for the third operand from the bits 56 to 63. The operand number register 600 holds a value "3" provided before hand through a line 304, as the control 307 is for the third operand. The read designation control 601 is constructed so as to provide the read designation signal onto the line 426 when the operand number provided by the register 600 is 1 and line 303C is on, or when the operand number provided by the register 600 is 2 or 3 and the line 303A is on.

The write designation control 602 is constructed so as to provide the write designation signal onto the line 413 when the operand number provided by the register 600 is "1" and the line 303A is on. Therefore, the write designation control 602 in the third operand control 307 does not provide the write designation signal.

The read pointer number control 603 includes a usage status table 604 which stores read control circuit usage signals each designating whether or not each of the three read control circuit for each vector register is in use or not, and select control 605 which reads out, in response to the read designation signal on the line 426, read control circuit usage signals from the usage status table 604 for the three read control circuits for the vector register designated by the vector register number provided by the line 301A and, based upon the read out signal, detects whether or not there is any of the three read control circuits which is not in use. If one of the three read control circuits is detected as not in use, the select control 605 provides the number of the detected read control circuits as as a read pointer number onto the line 427, and changes the read control circuit usage signal for the detected read control circuit stored in the table 604 to a signal representing an in-use state.

Figure 9:
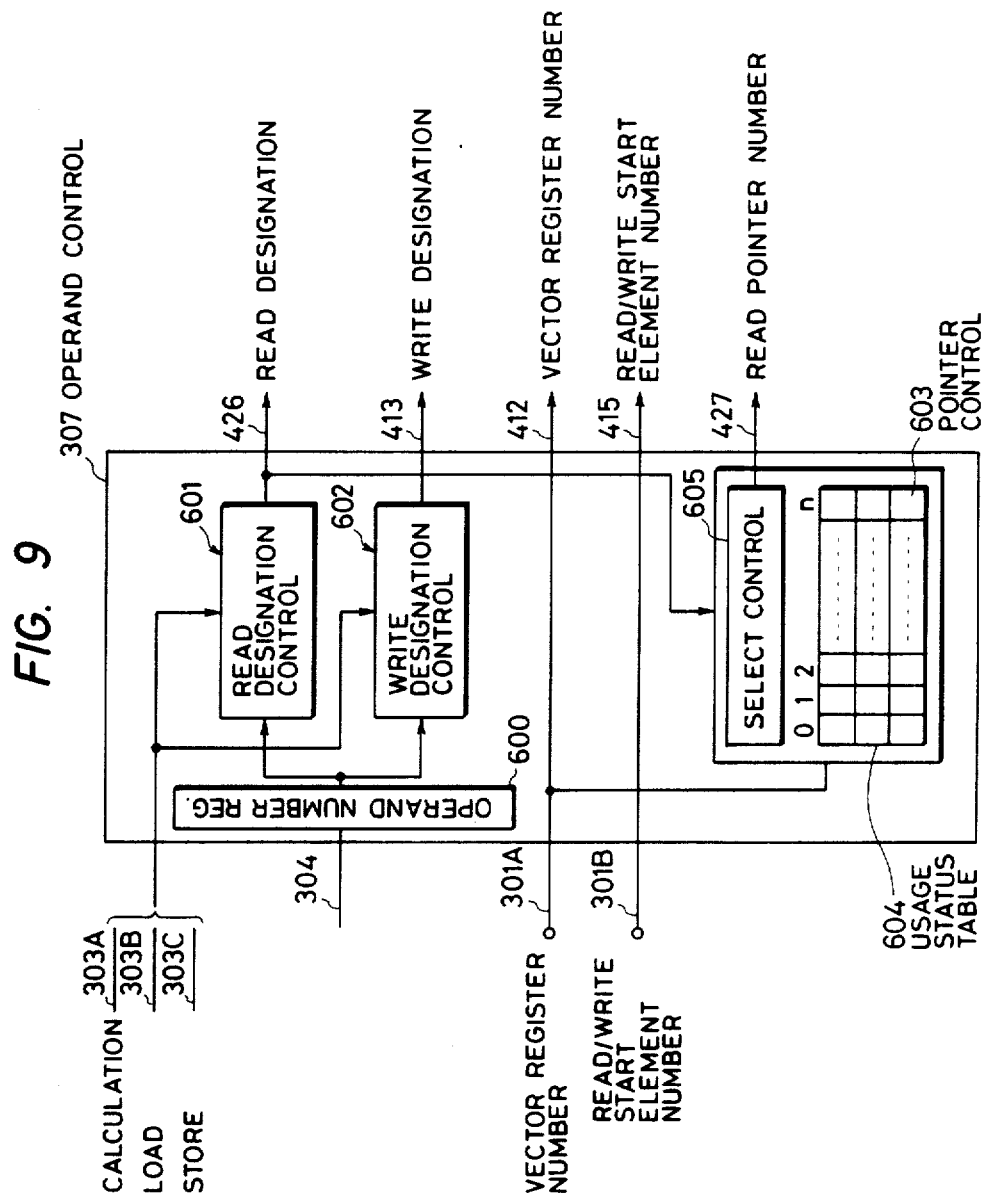
FIG. 9 is a schematic diagram of the third operand control (307) of FIG. 6.

The circuit shown in FIG. 9 can be used as the second operand control 306 if it is used in such a manner that a value "2" is set in the register 600 and the vector register number and the read/write start element number are provided from the bits 32 to 39 and bits 40 to 47 of the vector instruction register 301, respectively. Furthermore, the circuit shown in FIG. 9 can be used as the first operand control 305, if it is used in such a manner that a value "1" is set in the register 600 and the vector register number and the read/write start element number are provided from the bits 16 to 23 and 24 to 31, respectively.

Referring to FIG. 6 again, a VAR number delivery control circuit 208 and a VIR number delivery control circuit 309 operate only in the case of processing which is effected by a load or store vector instruction in which the control signal line 303B or 303C is ON. The control circuit 308 delivers the VAR number provided from the bits 32 to 39 of the instruction register 301 onto the signal line 210, in response to an "on" signal on either one of the lines 303B or 303C. The control circuit 309 delivers the VIR number provided from the bits 80 to 87 of the instruction register 301, in response to an "on" signal on either one of the lines 303B or 303C. The reference numeral 310 represents a processed vector number delivery control circuit which selects the portion of the vector instruction register 301 represented by the bits 48 to 63 when either of the control signal lines 303B and 303C is ON, that is, when the decoded instruction is a load or store vector instruction and delivers the selected bit portion. When any of the control signal lines 303B and 303C is OFF, on the other hand, the processed vector element number delivery control circuit 310 selects the processed vector element number holding register 226 mentioned in the description with reference to FIG. 5 and delivers the contents of the register 226. It is to be noted that the processed vector element number is transferred to the register 226 from the main storage 201 (FIG. 5) by way of a line 228 in response to a scalar instruction.

The control data delivered from the first, second and third operand control circuits 305, 306 and 307 and the processed vector element number control circuit 310 are sent to the vector register control circuits through the control signal line group 224 shown in FIG. 5. On the other hand, the VAR number and the VIR number are delivered through a control line 210.

The following is a description of the arrangement of each vector register control circuit and each vector register in accordance with the embodiment of the invention with reference to FIG. 7. FIG. 7 shows the arrangement of one vector register and one vector register control circuit for the vector register. The vector processing apparatus shown in FIG. 5 has (n+1) circuits such as that shown in FIG. 7. In FIG. 7, the reference numerals 401, 402, 403 denote memory modules (referred to simply as "RAMs", hereinafter). One RAM is able to store 512 vector data elements. In each RAM, the reference symbols DIN, DOUT and WE respectively represent a write data input terminal, a read data output terminal and a write enable terminal. When a signal value 1 is fed to the terminal WE, the RAM is brought into a write enable state. The reference symbol WP denotes a write pointer terminal which receives an address in the RAM at which is written a write data element which is provided from the terminal DIN. The reference symbol RE represents a read enable terminal. When a signal value 1 is fed to the terminal RE, the RAM is brought into a read enable state. The reference symbol RP denotes a read pointer terminal which receives an address in the RAM at which has been stored a read data element which is to be output from the terminal DOUT. The reference numeral 404 represents a data register which initially holds the write data which is delivered from the load and store circuits 206 and 207, the adders 213 and 214, or the multiplier 215 by way of the switch 225 as shown in FIG. 5 and supplies the write data to the RAM. The reference numerals 405, 406 and 407 represent read data registers which hold the data read out from the RAMs 401 to 403, the adders 213 and 214 or the multiplier 215 all shown in FIG. 5. Each of the vector registers in accordance with this embodiment is, as shown in FIG. 7, constituted by three memory modules 401, 402, 403 (respectively referred to as a "RAM0", a "RAM1" and a "RAM2", hereinafter). The arrangement is such that the write data register is jointly connected to the three RAM modules, RAM0, RAM1, RAM2, while the read data registers are respectively connected to the three RAM modules RAM0, RAM1, and RAM2. This is because write data is simultaneously written into the three RAM modules RAM0, RAM1 and RAM2, whereas it is intended to permit the data written in the RAM to be individually read out from the RAM0, RAM1 and RAM2, thereby allowing the contents of one vector register to be simultaneously and independently delivered to three load and store circuits at maximum or the adders or the multiplier. It is to be noted here that the multiplicity 3 of the RAM module is not essential to the present invention and is provided in terms of the arrangement of the vector processing apparatus mainly for reasons of packaging. The reference numeral 408 denotes a write control circuit which delivers a write enable signal and a write address to the RAM0, the RAM1 and the RAM2. The reference numerals 409, 410 411 represent read control circuits (respectively referred to as a "read control circuit 0", a "read control citcuit 1", and a "read control circuit 2", hereinafter) which respectively deliver read enable signals and read addresses to the RAM0, the RAM1 and the RAM2. The three read control circuits 409, 410 and 412 have completely the same structure but are able to operate independently of one another.

Figure 10:
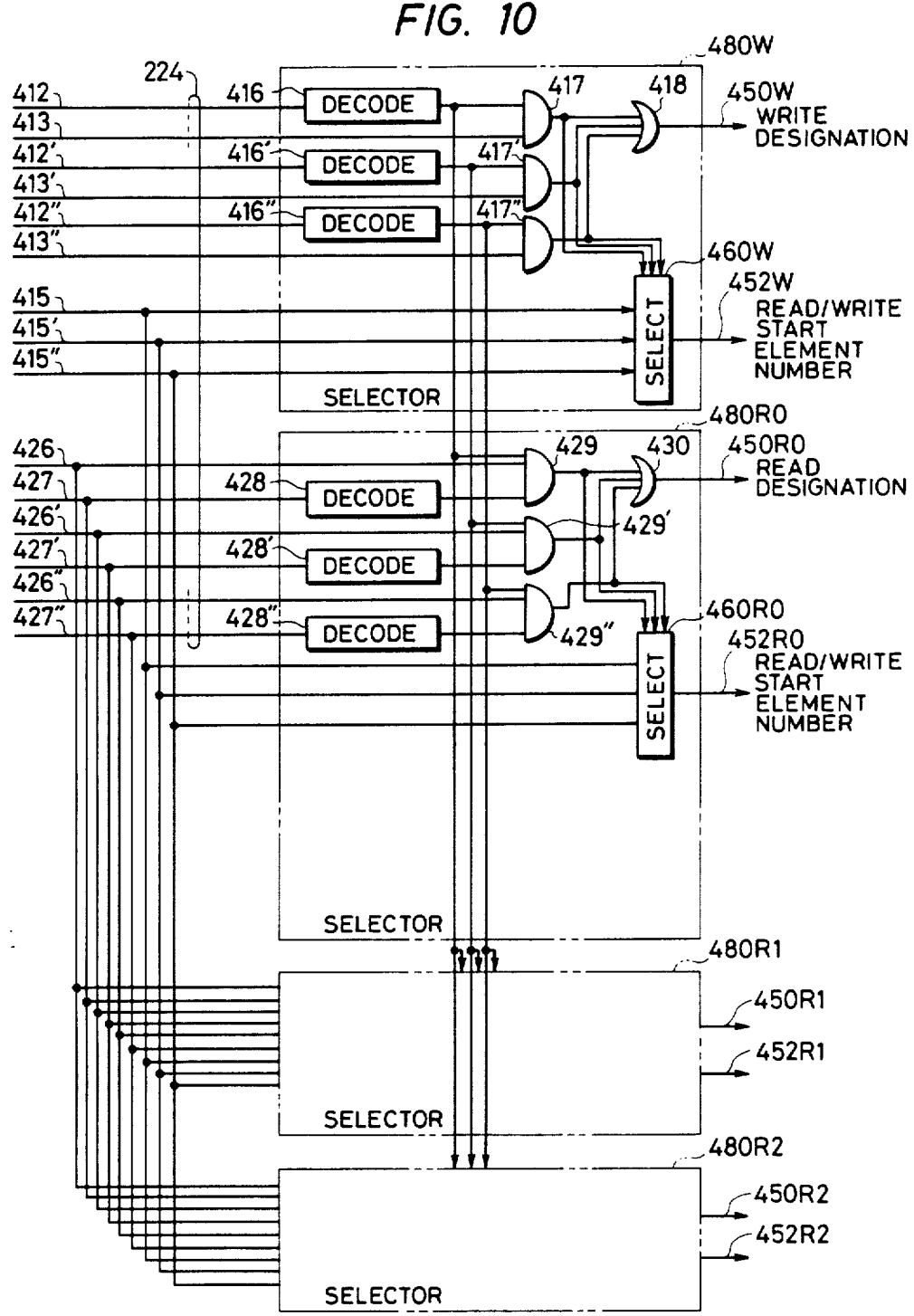
FIG. 10 is a schematic diagram of a selector (480) of FIG. 7.

The reference numeral 480 represents a selector which selects from data on the signal line group 224 which is necessary to drive the write control circuit 408 and the three read control circuits 409 to 411. As shown in FIG. 10, the selector 480 includes four selectors 480, 480R0, 480R1 and 480R2. The selector 480 selects from data on the signal line group 224, and delivers a write designating signal and read/write start element numbers all relating to a write operation for a corresponding vector register, such as vector register 216 for example. The decoder 416 detects whether or not a vector register number provided onto the line 412 by the third operand control designates the correspnding vector register 216. The AND gate 417 transfers the write designating signal provided on the line 413 onto the line 450W by way of an OR gate 418, when the decoder 416 provides a positive detection result. At the same time, a selector 460W selectively transfers, in response to an output of the AND gate 417, the read/write start element number provided on the line 415 by the third operand control 307 onto a line 452W. Two more decoders 416' and 416" and two more AND gates 417' and 417" are provided so that outputs of the second operand control 306 and the first operand control 305 are similarly detected and transferred to the lines 450W and 452W.

The selector 480R0 selects from data on the signal line group 224 and delivers a read designating signal and a read/write start element number all relating to a read operation for a corresponding vector register 216 and the read control 409. Similarly, the selctors 480R1 and 480R2 are provided for the two read controls (1 and 2) 410 and 411 for the same corresponding vector register 216. The selector 480R0 includes a decoder 428 which detects whether or not the read pointer number provided on the line 427 by the third operand control 307 corresponds to the read control (0) 409. The AND gate 429 responds to the outputs of the decoders 416 and 428 and the read designation signal on the line 426, to transfer the read designation signal to a line 450R0 by way of an OR gate 430, when the outputs of the two decoders 416 and 428 are "1". A selector 460R0 selectively transfers, in response to an output of the AND gate 429, the read/write start element number provided on the line 415 by the third operand control 307 onto a line 452R0. A decoder 428' and an AND gate 429' perform similar functions as the decoder 428 and the AND gate 429. It is the same with the decoder 428" and the AND gate 429".

The outputs 450R1 and 452R1 of the selector 480R1 and the outputs 450R2 and 452R2 correspond to the outputs 450R0 and 452R0. The processed element number on the line 414 is transferred directly to the write control 408 and the three read controls (0 to 2) 409 to 411.

The following is a detailed description of the operation of writing vector data into one vector register with reference to FIG. 7. In a write operation, a write designating signal, a processed vector element number signal and s write starting element number signal are delivered to the write control 408 by way of the lines 450W, 414 and 454W. The reference numeral 418 denotes a write enable signal generating circuit which starts to deliver a write enable signal when a write designating signal arrives thereat through the control line 452W. The reference numeral 419 denotes a register which holds the number of vector elements which have not yet been written. The reference numeral 420 represents a register which holds an address in the RAM at which data is subsequently written. The reference numeral 421 denotes a circuit which checks if the contents of the register 419 are all zero. The reference numerals 422, 423 respectively represent a minus-1 counter and a plus-1 counter. The reference numeral 424 denotes a selector circuit which selects a processed vector element number signal delivered thereto through the control line 414, when a write designating signal arrives thereat through the control line 413. In the other cases, the selector circuit 424 selects the input value of the minus-1 counter 422 and sets the selected value in the register 419. The reference numeral 425 denotes a selector circuit which selects a read/write starting element number signal delivered thereto through the control line 452W, when the write designating signal arrives thereat through the control line 450. In the other cases, the selector circuit 425 selects the output value of the plus-1 counter 423 and sets the selected value in the register 420. In a write operation, in accordance with the arrival of the write designating signal by way of the line 450, the processed vector element number and the write starting element number provided by the lines 450W and 452W are respectively set in the register 419, 420, and a write operation is commenced. the content of the register 420 is applied to the respective terminals WP of the RAM0, RAM1, RAM2, as a data write address. Moreover, when one vector data element has been written, the content of the register 420 is renewed by the plus-1 counter 423 so as to represent an address at which data is subsequently to be written. The processed vector element number set in the register 419 is renewed by being decremented by 1 by the minus-1 counter 422 every time data is written in one position. When the value 0 is detected by a zero detecting circuit 421, the write enable signal generating circuit 418 is informed of the fact that the value is 0 so as to change the write enable signal value to "0", thereby completing the write operation.

The following is a description of the operation of reading out vector data from the RAM0. In a read operation, a processed vector element number signal, a read/write starting element number signal, and a read designating signal are delivered to one of the three read control circuits 409 to 411. The reference numeral 436 represents a read enable signal generating circuit which start to deliver the read enable signal when the read designating signal arrives thereat through the control signal line 450R0. The reference numeral 429 denotes a register which holds the number of vector elements which have not yet been subjected to the read processing. The reference numeral 430 represents a register which holds an address in the RAM from which data is to be subsequently read out. The reference numerals 431, 432 and 433 respectively represent a zero detecting circuit, a minus-1 counter and a plus-1 counter. Further, the reference numerals 434, 435 denote selector circuits. The read operation is carried out in the same manner as that in the case of the write control circuit. With the arrival of the read designating signal by way of the line 450R0, the read starting element number signal provided in the line 452R0 are brought into the registers 430 and 429 by way of the selector 435 and 434, respectively, and reading of data is commenced. The content of the register 430 is applied to the terminal RP of the RAM0 as a read data address and is renewed by being incremented by 1 by the plus-1 counter 433 every time one data is read out, so as to specify an address at which data to be subsequently read out has been stored. The contents of the register 434 are renewed by being decremented by 1 by the minus-1 counter 432 every time one data element is read ot. When the zero detecting circuit 431 detects the fact that the value of the register 434 is zero, the read enable signal generating circuit is informed of the fact so as to change the state of the read operation.

When data is to be read out from the RAM1, "1" is given as a read pointer number by some of the first to third read controls 305 to 307 to the selector 480 so that the read control circuit 1 is similarly actuated to effect a read processing; when data is to be read out from the RAM2, "2" is given to the selector 480 as a read pointer number, so that the read control circuit 2 is similary actuated to effect a read processing. The three read control circuits are able to operate simultaneously and independently of one another.

How the FORTRAN program shown in FIG. 1 is processed in the embodiment of the invention shown in FIGS. 5, 6 and 7 will be described hereinunder.

Outlines of the processing of the FORTRAN program shown in FIG. 1 in the embodiment are as follows:

(1) A total of 102 vector element of the array data A are loaded into the vector register No. 9 (VR0) in the order, A(0), A(1), A(2), ..., A(99), A(100), A(101).

(2) The vector elements A(0), A(1), ..., A(98), A(99) (corresponding to the vector A(I−1) in FIG. 3) are successively read out from the RAM0 in the vector register VR0, and the vector elements A(1), A(2), ..., A(99), A(100) (corresponding to the vector A(I) in FIG. 3) are successively read out from the RAM1 of the vector register VR0. The read-out vector elements are added together, and the result of addition is stored in the RAM0, RAM1 and RAM2 of the vector register No. 1 (VR1).

(3) The result of calculation of A(I−1)+A(I) is read out from the RAM0 of the vector register VR1, and at the same time, the vector elements A(2), A(3), ..., A(101) (corresponding to the vector A(I+1) in FIG. 3) are successively read out from the RAM2 of the vector register VR0. The read-out result and vector elements are added together, and the result of addition is stored in the vector register No. 2 (VR2).

(4) Then, the result of calculation of A(I−1)+A(I)+A(I+1) is read out from the RAM0 of the vector register VR2 and is multiplied by 0.33. The result of multiplication is stored in the vector register VR3 and is subsequently stored in the main memory.

FIG. 8 shows vector instruction trains which schematically describe the above-described processing in accordance with the vector instruction formats shown in FIG. 4a and 4b. In FIG. 8 are not shown the multiplication betwen 0.33 and A(I−1)+A(I)+A(I+1) and the storing of the result of multiplication into the main memory which are not directly related to the present invention. Further, in starting of execution of the vector instruction trains shown in FIG. 8, it is assumed that the register 226 shown in FIG. 5 has already stored therein the value 100 as a number of vector elements to be processed; the VAR0 in FIG. 5 has already stored therein the address of the array data element A(0) on the main memory; and the VIR0 in FIG. 5 has already stored therein the distance between the elements of the array data A on the main memory.

In FIG. 8:

The instruction 1 instructs that 102 elements of the array A whose addresses are given by the VAR0 and the VIR0 should be read out from the main memory and successively stored from the element number 0 of the VR0 (A(0) to A(101) are loaded in the VR0).

The instruction 2 instructs that 100 vector elements should be sucessively read out from the VR0 from the element number 0, while 100 vector elements should be succesively read out from the VR0 from the element number 1, and the read-out vector elements should be added together, and then the results of addition should be successively stored in the VR1 from the element number 0 (A(I−1)+A(I), I=1 to 100 are loaded in the VR1).

The instruction 3 instructs that 100 vector elements should be successively read out from the VR1 from the element number 0, while 100 vector elements should be successively read out from the VR0 from the element number 2, and the read-out vector elemets should be added together, and then the results of addition should be successively stored in the VR2 from the element number 0 (A(I−1)+A(I)+A(I+1), I=1 to 100 are loaded into the VR2).

In FIG. 5:

When the instruction 1 is read out from the main memory and is decoded in the instruction decoding and execution control circuit 203, the value 0 is delivered through the control signal line 210 as a number of the VAR and VIR. Consequently, the respective values of the VAR0 and the VIR0 are read out and delivered through the address line 211 to the load and store circuit 206 where the address calculation is carried out. Further, the value 0 as a vector register number, the value 0 as a write starting element number, the write designating signal and the value 102 as a processed vector element number are delivered through the control signal line group 224. Thereupon, the VR0 control circuit 220 is actuated to effect writing of data into the VR0.

When the instruction 2 is decoded, the following signals are delivered through the control signal line group 224.

As to the first operand:

(a) A signal representing the value 1 as a vector register number;

(b) A write designating signal; and (c) A signal representing the value 0 as a write starting element number.

As to the second operand:

(a) A signal representing the value 0 as a vector register number;

(b) A read designating signal;

(c) A signal representing the value 0 as a read starting element number; and (d) A signal representing the value 0 as a read pointer number.

As to the third operand:

(a) A signal representing the value 0 as a vector register number;

(b) A read designating signal;

(c) A signal representing the value 1 as a read starting element number; and (d) A signal representing the value 1 as a read pointer number.

In addition, a signal is delivered which represents, as a processed vector element number, the value 100 which is represented by the contents of the register 226. Consequently, the VR0 control circuit 220 and the VR1 control circuit 229 are actuated to succesively read out vector data from the RAM0, the RAM1 and the VR0. The read-out data are delivered to the adder 213, and the result of addition is written into the VR1.

When the instruction 3 is decoded, the following signals are delivered from the vector instruction decoding and execution control circuit 100 through the control signal line group 224.

As to the first operand:

(a) A signal representing the value 2 as a vector register number;

(b) A write designating signal; and (c) A signal representing the value 0 as a write starting element number.

As to the second operand:

(a) A signal representing the value 1 as a vector register number;

(b) A read designating signal;

(c) A signal representing the value 0 as a read starting element number; and (d) A signal representing the value 0 as a read pointer number.

As to the third operand:

(a) A signal representing the value 0 as a vector register number; .tf (b) A read designating signal;

(c) A signal representing the value 2 as a read starting element number; and (d) A signal representing the value 2 as a read pointer number.

In addition, a signal is delivered which represents, as a processed vector element number, the value 100 which is represented by the contents of the register 226. Consequently, the VR0 control circuit 220, the VR1 control circuit 221 and the VR2 control circuit are actuated in such a way as to successively read out vector data from the RAM0 of the VR1 and the RAM2 of the VR0. The read-out vector data is delivered to the adder 214, and the result of addition is written into the vector register VR2.

As describd above, in the processing of the FORTRAN program shown in FIG. 1 in accordance with the embodiment, a total of 102 elements of the array data A from A(0) to A(101) is loaded into the vector register only once. In the calculation of A(I−1)+A(I)+A(I+1) and the addition of I=1 to 100, the vector data A(i−1), A(I) and A(+1) is not handled separately from one another but is read out from the same vector register from the respective read starting elements, that is, A(0), A(1), A(2). By this arrangement, it is possible to avoid carrying out the load operation in accordance with the prior art described with reference to FIG. 2 in which a plurality of vector data, almost all the elements of which overlap one another, are separately loaded. Thus, it is possible to reduce the main memory reference load.

According to the embodiment, the calculation vector instruction is arranged in such a way as to specify both the number of a vector register to effect a read or write operation and an element in the vector register from which a read or write operation is to be commenced, thereby allowing reading or writing of data to be effected from any desired element in the vector register. Furthermore, the store vector instruction which designates data transfer between the main memory and the vector registers is, on the other hand, arranged in such a way as to be able to specify the number of vector elements to be transferred as desired. Thus, in such a case where several different kinds of partial references are made in relation to certain array data, it is possible to avoid reading out data from the main memory for each of the different kinds of partial reference and to effect processing such that the sum of sets of data required for a plurality of different kinds of partial reference is stored in a vector register only once, and each partial reference is processed on the vector register.

What is claimed is:

1. A vector processing apparatus, comprising:
    a main storage,
    transfer means connected to said main storage for fetching vector data elements from said main storage and for storing vector data elements into said main storage;
    at least one operation means for performing an operation on inputs provided to said operation means and providing outputs corresponding to results to results of the operation;
    a plurality of vector registers connected to said transfer means and said operation means, each for holding at least a set of vector data elements;
    a plurality of access means each connected to a corresponding addresses for storage locations within a corresponding vector register to write or read vector data elements in or from said corresponding vector register
    connect means responsive to program instructions for selectively connecting said vector registers to said transfer means and to said operation means, so that vector data elements read out from said corresponding vector register are provided to said operation means as the inputs thereto or to said transfer means as the vector data elements to be stored into said main storage, or so that the outputs of said operation means or vector data elements fetched by said transfer means are written into said corresponding vector register; and
    means for setting an initial address which may differ from a start address of said storage locations of said one vector register in one of said plurality of access means for a vector register so as to enable said access means for that vector register to effect generation of sequential addresses starting from an initial storage location designated by the initial address.

2. A data processing apparatus according to claim 1, wherein said access means for each vector register includes:
    write address means for sequentially generating write addresses to access said storage locations within the vector register; and
    read address means for sequentially generating read addresses to access said storage locations within the vector register;
    and wherein said initial address setting means includes means for selectively setting the initial address into one of said write address means and said read address means for said one vector register.

3. A data processing apparatus according to claim 2, wherein said plurality of vector registers are grouped with each group including a plurality of vector registers, each group of vector registers being connected to share a common input and a common write access means so as to simultaneously write vector data elements received through an input common to each group of vector registers into each group of vector registers when each group is selected by a first program instruction which selectively designates a group of vector registers for which a write operation is to be performed.

4. A data processing apparatus according to claim 3, wherein said initial address setting means operate in response to the program instruction.

5. A data processing apparatus according to claim 3, further comprising means responsive to a second program instruction which selectively designates a group of vector registers for which read operation should be done, for selectively starting one of plural read means each associated with each of plural registers belonging to the designated group of vector registers selected by the programs instruction.

6. A data processing apparatus according to claim 2, wherein said one vector register is a vector register designated by an instruction as a vector register for read out of vector data therefrom; and
    wherein said initial address setting means includes means responsive to the instruction for setting the initial address into said read address means for said one vector register as an initial read address.

7. A data processing apparatus according to claim 6, wherein the initial address is designated by the instruction.

8. A data processing apparatus according to claim 7, further including means responsive to the instruction for activating said read address means for said one vector register so as to read vector data held thereby and so as to supply the read out vector data to one of said operation means and said transfer means.

9. A data processing apparatus according to claim 6, further including means responsive to the instruction for activating said read address means for said one vector register so as to read vector data held thereby and so as to supply the read out vector data to one of said operation means and said transfer means.

10. A data processor according to claim 2, wherein said one vector register is a vector register designated by an instruction as a vector register for writing of vector data therein; and
wherein said initial address setting means includes means responsive to the instruction for setting the initial address into said write address means for said one vector register as an initial write address.

11. A data processing apparatus according to claim 10, wherein the initial address is desginated by the instruction.

12. A data processing apparatus according to claim 11, further including means responsive to the instruction for activating said write address means for said one vector register so as to write therein vector data transferred from one of said transfer means and said operation means.

13. A data processing apparatus according to claim 10, further including means responsive to the instruction for activating said write address means for said one vector register so as to write therein vector data transferred from one of said transfer means and said operation means.

14. A data processing apparatus according to claim 2, wherein said initial address setting means includes means for setting an initial read address into said read address means for a first vector register to be used so as to read and provide vector data therefrom to said operation means and for setting an initial write address into said write address means for a second vector register to be used so as to write therein vector data provided by said operation means.

15. A data processing apparatus according to claim 14, wherein said first and second vector registers are designated by a common instruction.

16. A data processor according to claim 15, wherein the initial read addresses and the initial write addresses are designated by the instruction.

17. A data processing apparatus according to claim 16, further comprising means responsive to the instruction for activating said read address means for said first vector register so as to read vector data therefrom and so as to supply the read vector data to said operation means and for activating said write address means for said second vector register so as to write therein vector data provided by said operation means as results of the operation on the read vector data.

18. A data processing apparatus according to claim 15, further comprising means responsive to the instruction for activating said read address means for said first vector register so as to read vector data therefrom and so as to supply the read vector data to said operation means and for activating said write address means for said second vector register so as to write therein vector data provided by said operation means as results of the operation on the read vector data.

19. A data processing apparatus according to claim 2, wherein each vector register includes a plurality of storage means connected to a common input each for holding vector data and each having an individual output;
wherein said write access means for each vector register is provided in common to and connected to said plurality of storage means of the vector register so as to provide some addresses thereto so as to write some vector data provided through the common input thereof into each thereof;
wherein said read access means for each vector register includes a plurality of read access means each connected to a corresponding one of said plurality of storage means.

20. A data processing apparatus according to claim 19, wherein said initial address setting means includes means for selectively setting an initial address into one of said write address means for said one vector register and said plurality of read address means for said one vector register.

21. A data processing apparatus according to claim 20, wherein said one vector register is a vector register designated by an instruction as a vector register for readout of vector data therefrom; and
wherein said initial address setting means includes means responsive to the instruction for setting the initial address one of said plurality of read address means for said one vector register as an initial read address.

22. A data processing apparatus according to claim 21, wherein initial address setting means includes means for selecting, as said one read means, one read means which is not in use among said plurality of read means for said one vector register.

23. A data processing apparatus according to claim 22, wherein the initial address is designated by the instruction.

24. A data processing apparatus according to claim 23, further including means responsive to the instruction for activating said one read address means for said one vector register so as to read vector data held thereby and so as to supply the read out vector data to one of said operation means and said transfer means.

25. A data processing apparatus according to claim 22, further including means responsive to the instruction for activating said one read address means for said one vector register so as to read vector data held thereby and so as to supply the read out vector data to one of said operation means and said transfer means.

26. A data processing apparatus according to claim 20, wherein said one vector register is a vector register designated by an instruction as a vector register for writing of vector data therein; and
wherein said initial address setting means includes means responsive to the instruction for setting the initial address into said write address means for said one vector register as an initial write address.

27. A data processing apparatus according to claim 26, wherein the initial address is designated by the instruction.

28. A data processing apparatus according to claim 27, further including means responsive to the instruction for activating said write address means for said one vector register so as to write therein vector data transferred from one of said transfer means and said operation means.

29. A data processing apparatus according to claim 26, further including means responsive to the instruction for activating said write address means for said one vector register so as to write therein vector data transferred from one of said transfer means and said operation means.

30. A data processing apparatus according to claim 19, wherein said initial address setting means includes means for setting an initial read address into one of said plurality of read address means for a first vector register to be used so as to read and provide vector data therefrom to said operation means and for setting an initial write address into said write address means for a second vector register to be used so as to write therein vector data provided by said operation means.

31. A data processing apparatus according to claim 30, wherein said initial address setting means includes means for selecting, as said one read address means, one read address means which is not in use among said plurality of read address means for said first vector register.

32. A data processing apparatus according to claim 31, wherein said first and second vector registers are designated by a common instruction.

33. A data processing apparatus according to claim 32, wherein the initial read addresses and the initial write addresses are designated by the instruction.

34. A data processing apparatus according to claim 33, further comprising means responsive to the instruction for activating said read address means for said first vector register so as to read vector data therefrom and so as to supply the read vector data to said operation means and for activating said write address means for said second vector register so as to write therein vector data provided by said operation means as a result of the operation on the read vector data.

35. A data processing apparatus according to claim 31, further comprising means responsive to the instruction for activating said read address means for said first vector register so as to read vector data therefrom and so as to supply the read vector data to said operation means and for activating said write address means for said second vector register so as to write therein vector data provided by said operation means as a result of the operation on the read vector data.

36. A data processing apparatus according to claim 1, further comprising
means for setting a total element number in said access means of said one vector register so as to enable said access means to stop its operation after generation of sequential addresses for vector data elements equal in number to the total element number.

37. A data processing apparatus according to claim 1, wherein said access means for said one vector register includes means for generating addresses starting from the initial address when activated for a read operation to said one vector register.

38. A data processing apparatus according to claim 1, wherein said access means for said one vector register includes means for generating addresses starting from the initial address when activated for a write operation of said one vector register.

39. A data processing apparatus according to claim 1, wherein said one vector register is a vector register designated by an instruction as a vector register for readout of vector data therefrom; and
wherein said initial address setting means includes means responsive to the instruction for setting the initial address into said address means for said one vector register as an initial read address.

40. A data processing apparatus according to claim 39, wherein the initial address is designated by the instruction.

41. A data processing apparatus according to claim 40, further including means responsive to the instruction for activating said address means for said one vector register so as to read vector data held thereby and so as to supply the read out vector data to one of said operation means and said transfer means.

42. A data processing apparatus according to claim 39, further including means responsive to the instruction for activating said address means for said one vector register so as to read vector data held thereby and so as to supply the read out vector data to one of said operation means and said transfer means.

43. A data processing apparatus according to claim 1, wherein said one vector register is a vector register designated by an instruction as a vector for writing of vector data therein; and
wherein said initial address setting means includes means responsive to the instruction for setting the initial address into said address means for said one vector register as an initial write address.

44. A data processing apparatus according to claim 43, wherein the initial address is designated by the instruction.

45. A data processing apparatus according to claim 44, further including means responsive to the instruction for activating said address means for said one vector register so as to write therein vector data transferred from one of said transfer means and said operation means.

46. A data processing apparatus according to claim 43, further including means responsive to the instruction for activating said address means for said one vector register so as to write therein vector data transferred from one of said transfer means and said operation means.

47. A data processing apparatus according to claim 1, wherein said intial address setting means includes means for setting an initial read address into said address means for a first vector register to be used so as to read and provide vector data therefrom to said operation means and for setting an initial write address into said address means for a second vector register to be used so as to write therein vector data provided by said operation means.

48. A data processing apparatus according to claim 47, wherein said first and second vector registers are designated by a common instruction.

49. A data processing appratus according to claim 48, wherein the initial read addresses and the initial write addresses are designated by the instruction.

50. A data processing apparatus according to claim 49, further comprising means responsive to the instruction for activating said address means for said first vector register so as to read vector data therefrom and so as to supply the read vector data to said operation means and for activating said address means for said second vector register so as to write therein vector data provided by said operation means as a result of the operation on the read vector data.

51. A data processing apparatus according to claim 48, further comprising means responsive to the instruction for activating said address means for said first vector register so as to read vector data therefrom and so as to supply the read vector data to said operation means and for activating said address means for said second vector register so as to write therein vector data provided by said operation means as a result of the operation on the read vector data.

52. A vector processing apparatus, comprising:

memory means for holding plural sets of vector elements;

vector storage means connected to receive vector elements from and to provide vector elements to said memory means for holding vector elements, including a plurality of vector registers each for holding vector elements in a plurality of storage locations provided in each vector register;

resource means connected to said vector storage means for receiving vector elements read out from said vector storage means and for providing vector elements to said vector storage means to be written therein;

control means connected to said vector registers for selectively accessing one of said vector registers so that vector elements held by one vector register are read out so as to provide the vector elements to said resource means or to said memory means or so that vector elements provided by said resource means or said memory means are written into said one vector register, said control means including means responsive to an instruction for limiting at least one of the read operations and the write operation of said one vector register to storage locations designated by the instruction of said one vector register, said selected storage locations being determined in accordance with the indicated address.

53. A vector processing apparatus, according to claim 52, wherein said limiting means includes means responsive to the instruction for limiting the read operation of said one vector register to successive storage locations starting from an initial storage location designated by the instruction.

54. A vector processing apparatus, according to claim 52, wherein said limiting means includes means responsive to the instruction for limiting the write operation of said second vector register to successive storage locations starting from an initial storage location designated by the instruction.

55. A vector processing apparatus according to claim 52, wherein:

said resource means includes operation means connected to said vector storage means for performing an operation on vector elements read out from a first vector register and for providing a second vector register with vector elements corresponding to the results of the operation; and said limiting means includes first limiting means responsive to the instruction for limiting the read operation of said first vector register to first storage locations designated by the instruction therewithin; and second limiting means for limiting the write operation of said second vector register to second storage locations designated by the instruction therewithin.

56. A vector processing apparatus according to claim 55, wherein first storage locations are successive storage locations starting from a first initial storage location designated by the instruction and said second storage locations are successive storage locations starting from a second initial storage location designated by the instruction.

57. A vector processing apparatus according to claim 55, wherein said first and second vector registers are designated by the instruction.

58. A vector processing apparatus according to claim 57, wherein said operation means is provided in common to said plurality of vector registers and said control means includes means responsive to the instruction for selectively connecting an output of the first vector register to an input of said operation means and an output of said operation means to an input of said second vector register.

59. A vector processing apparatus according to claim 52, wherein each vector register comprises a group of storage means, each storage means being accessible in parallel to an access to other storage means;

wherein said control means includes:

write means connected to said one vector register for writing vector elements each into each of said group of storage means within said one vector register when said one vector register is selected to write vector elements therein;

a group of read means each connected to a corresponding one of said group of storage means within said one vector register and operable in parallel to each other, each for reading vector elements from a corresponding storage means, said group of read means being operable such that one of said group of read means is activated when the one vector register is selected to read vector elements therefrom and another one of said group of read means is further activated before completion of the read operation by the one read means when the one vector register is further selected to read vector elements therefrom before the completion of the read operation by the one read means; and wherein said limiting means includes means responsive to the instruction for limiting the operation by said write means to said storage locations designated by the instruction within each of said group of storage means or the operation by one of said group of read means to said storage locations designated by the instruction within a corresponding storage means.

60. A vector processing apparatus, comprising:

memory means for holding plural sets of vector elements;

vector storage means, connected to receive vector elements from and to provide vector elements to said memory means, for holding vector elements, including a plurality of vector registers each having a plurality of storage means for respectively holding vector elements;

a plurality of resource means, connected to said vector storage means, each for receiving vector elements read out from one of said plurality of vector registers or for providing vector elements to said vector storage means so as to be written in one of said plurality of vector registers;

control means connected to said vector storage means for writing respective vector elements supplied from one of said plurality of resource means into respective ones of said plurality of storage means within one of said plurality of vector registers when the one vector register is selected to receive the supplied vector elements and for reading the supplied vector elements held by a first one of said plurality of storage means of said one vector register when the one vector register is selected so as to provide the supplied vector elements to one of said plurality of resource means, said control means including means for reading the supplied vector elements from a second one of said plurality of storage means of said one vector register when said one vector register is further selected, before completion of the reading of the supplied vector elements from said first one of said storage means, so as to provide the supplied vector elements to another one of said plurality of resource means.

61. A vector processing apparatus according to claim 60, wherein said control means includes a plurality of write means each connected to said plurality of storage means of a corrsponding vector register, each for writing vector elements supplied from one of said resource means into each of said plurality of storage means of the corresponding vector register; and
   a plurality of groups of read means each group of read means being connected to a corresponding vector register, each read means of a group of read means for a vector register being connected to a corresponding one of said plurality of storage means of the vector register, each for reading vector elements from a corresponding storage means of a corresponding vector register;
   activation means connected to said plurality of write means and said plurality of groups of read means and responsive to an applied instruction for selectively activating said write means connected to one vector register when the one vector register is designated by the instruction to write vector elements therein and for selectively activating one read means which is not in use among said group of read means connected to the one vector register when the one vector register is designated by the instruction so as to read vector elements therefrom.

62. A vector processing apparatus according to claim 60, wherein said control means includes means responsive to an applied instruction for detecting whether or not there is at least one storage means which is not in use for reading among said plurality of storage means of a vector register designated by the instruction so as to read vector elements therefrom and for allowing reading of vector elements held by the one storage means when the detection result is affirmative.

63. A vector processing apparatus, comprising:
   a main storage;
   a plurality of vector registers connected to said main storage means;
   operation means connected to said plurality of vector registers for performing an operation on vector elements provided from a vector register so as to provide results fo the operation to a vector register;
   a plurality of read means each connected to a corresponding vector register each for receiving an applied read start address which may differ from a predetermined start address and for sequentially providing said corresponding vector register with read addresses starting from the received read start address;
   a plurality of write means each connected to a corresponding vector register each for receiving an applied write start addresss which may differ from a predetermined start address and for sequentially providing said corresponding vector register with write addresses starting from the received write start addresses.

64. A vector processing apparatus according to claim 63, comprising:
   a main storage;
   a plurality of vector registers connected to said main storage;
   operation means connected to said plurality of vector registers for performing an operation on vector elements provided from a vector register so as to provide results of the operation to a vector register;
   each of said plurality of read means including means for receiving an applied total number of vector elements to be read and for sequentially providing said corresponding vector register with read addresses starting from the read start address until a total number of the provided read addresses becomes equal to the received total number of vector elements to be read; and each of said plurality of write means being connected to a corresponding vector register and each including means for receiving an applied total number of vector elements to be written and for sequentially providing said corresponding vector register with write addresses starting from the write start address until a total number of the provided write addresses becomes equal to the received total number of vector elements to be written.

* * * * *